March 26, 1940. H. J. CALDWELL 2,194,638
HORIZONTAL HONING MACHINE
Filed Nov. 19, 1938 4 Sheets-Sheet 1
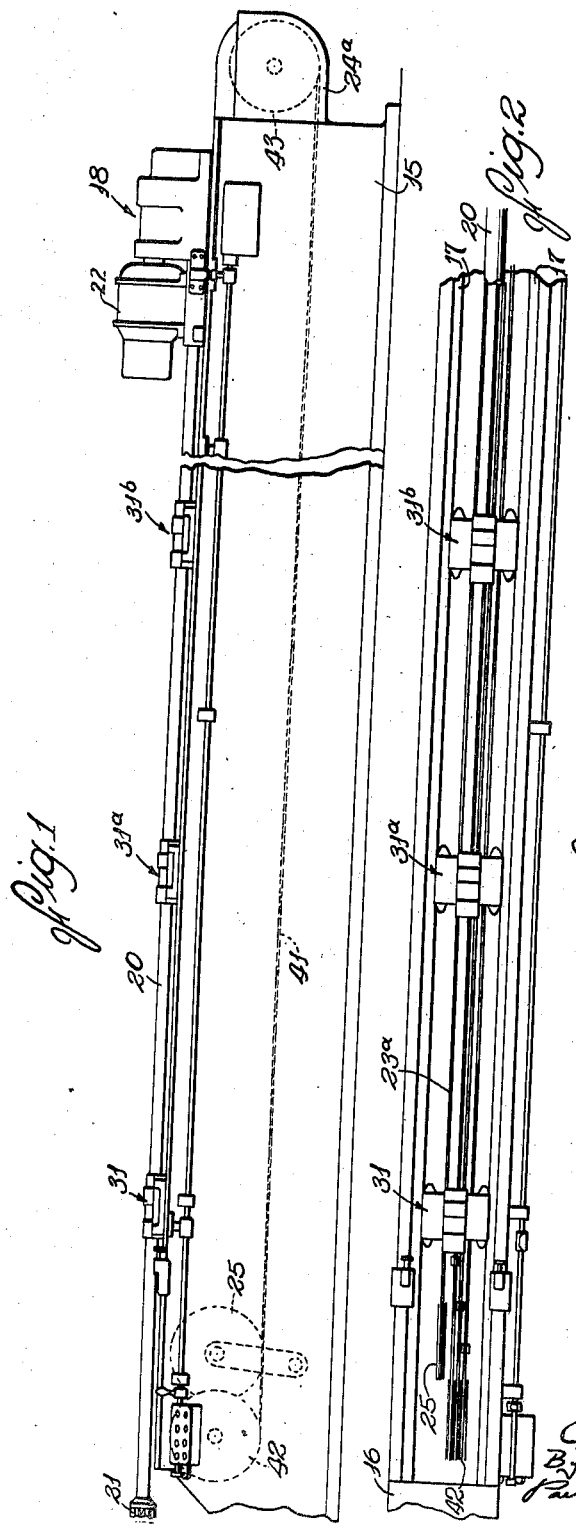
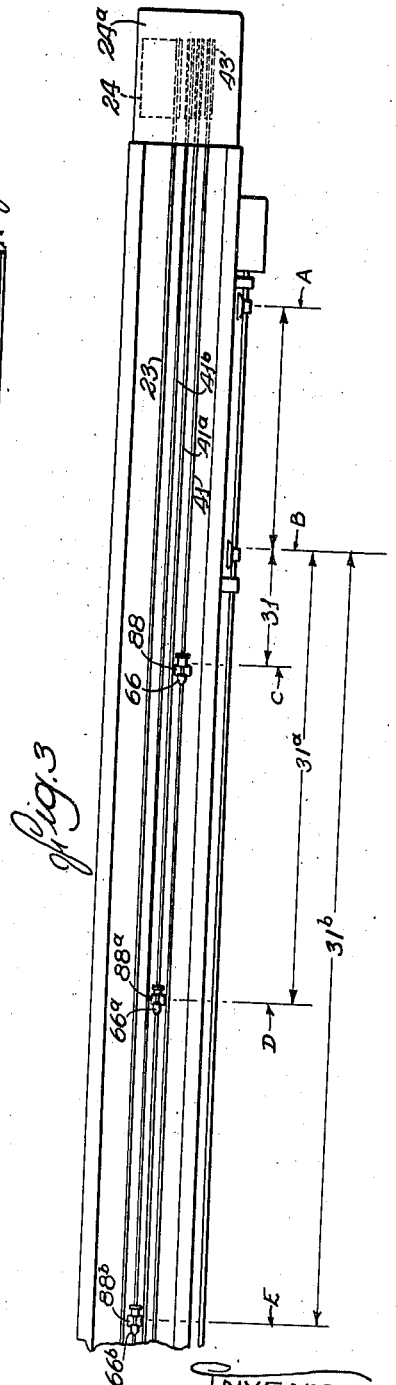
INVENTOR
Harry J. Caldwell
By Parker, Carton, Pitzner & Hubbard
ATTORNEYS

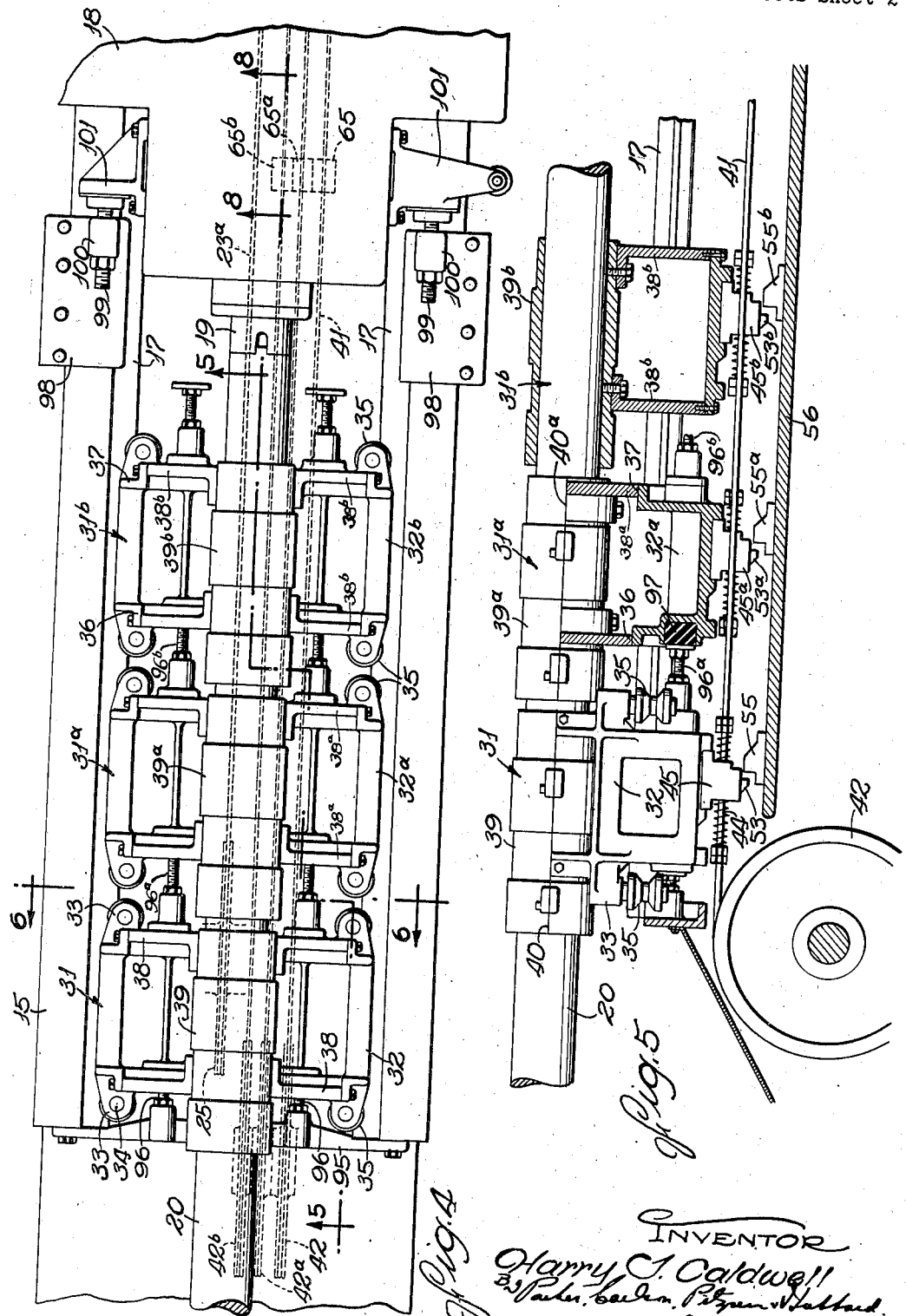

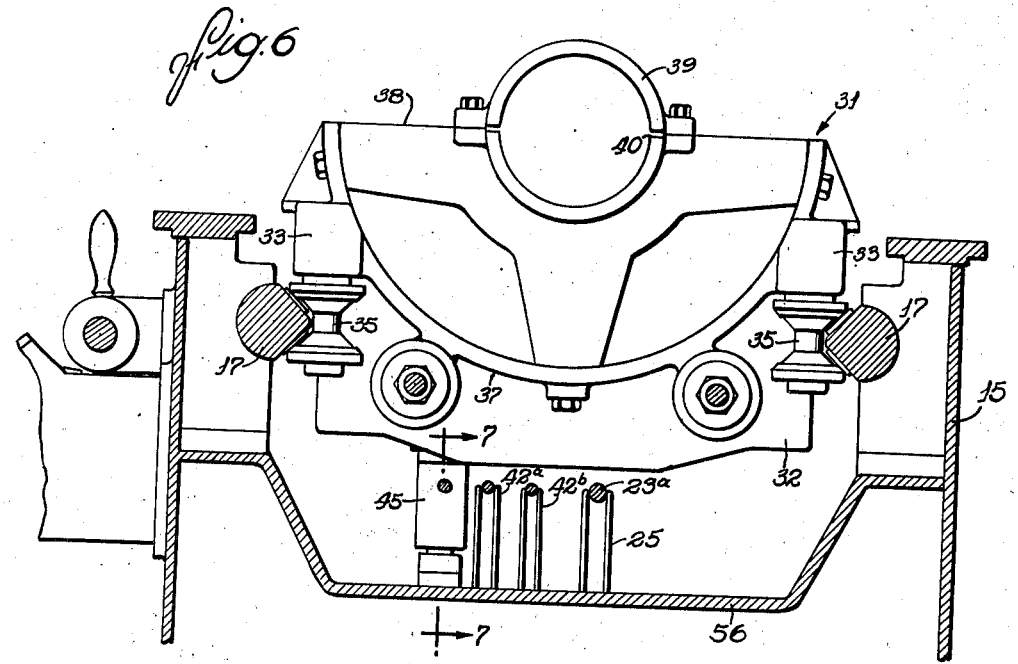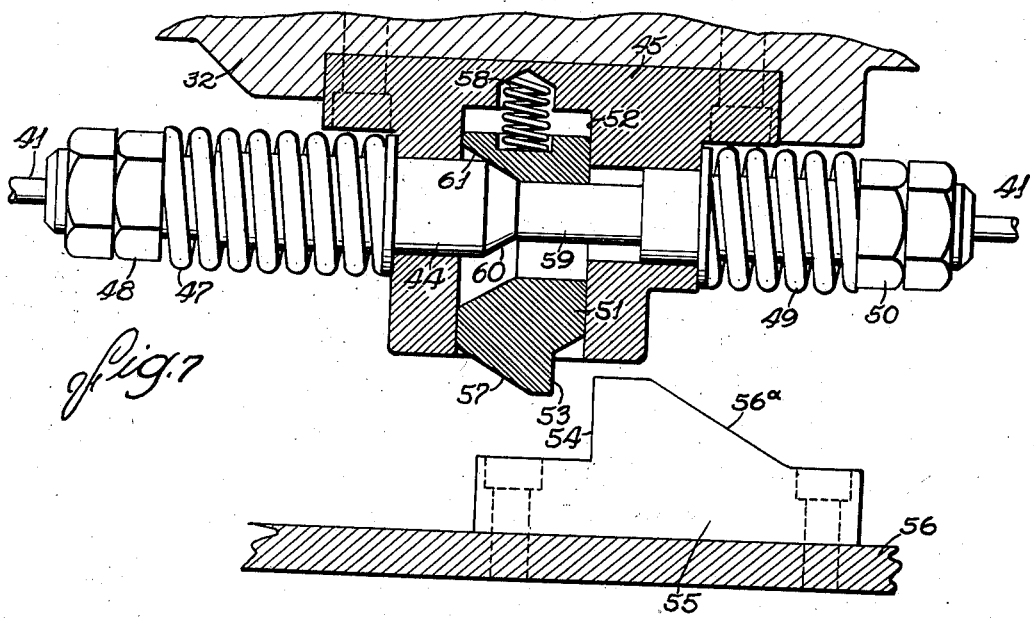

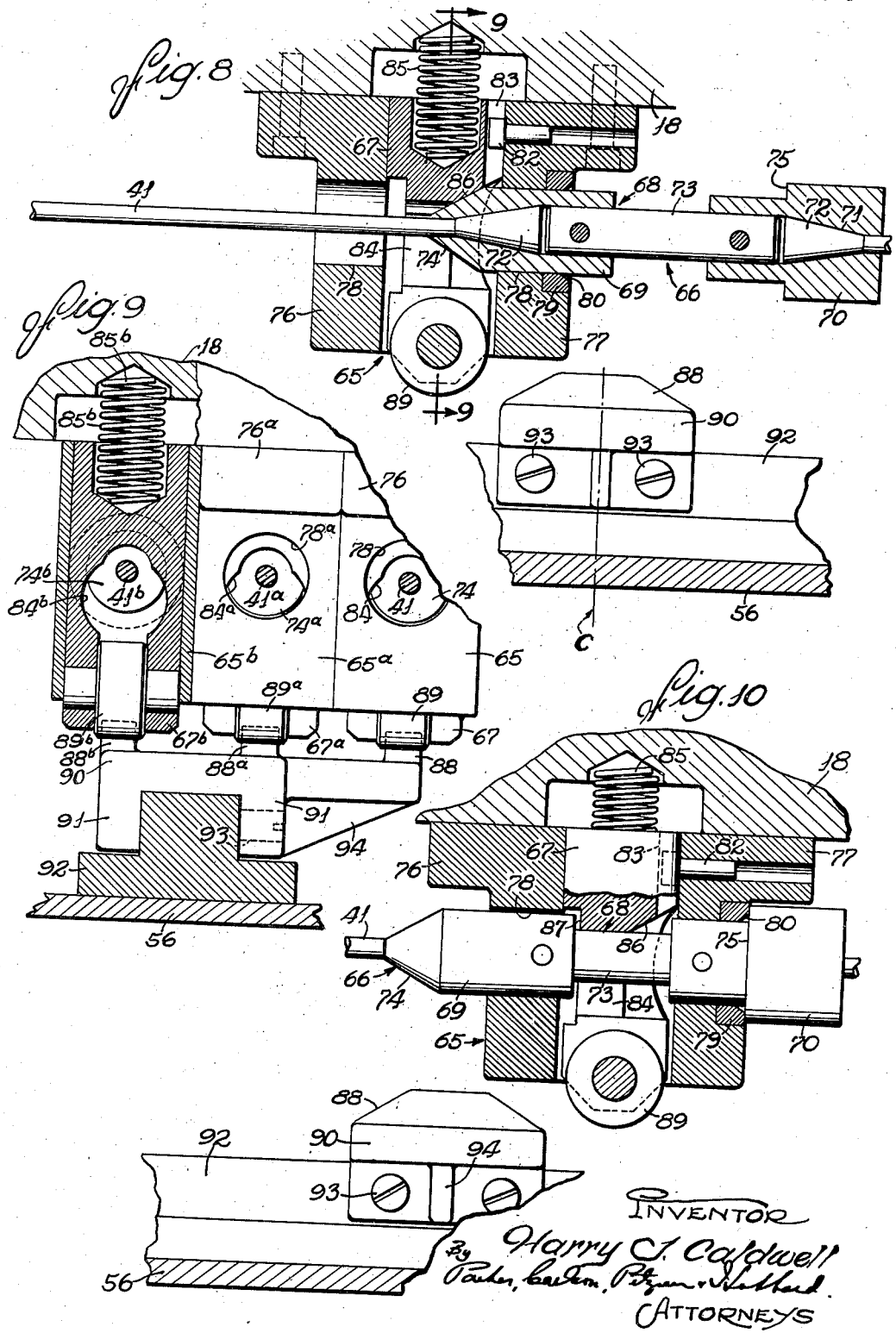

Patented Mar. 26, 1940

2,194,638

UNITED STATES PATENT OFFICE 2,194,638

HORIZONTAL HONING MACHINE

Harry J. Caldwell, Rockford, Ill., assignor to Barnes Drill Co., Rockford, Ill., a corporation of Illinois Application November 19, 1938, Serial No. 241,320

20 Claims. (Cl. 51—34)

The invention relates to machines for dressing the internal surfaces of cylindrical work pieces by a honing operation in which a cylindrical abrasive tool or hone is rotated and simultaneously reciprocated in contact with the surface to be dressed.

When the work is of considerable length, machines of the above general character are usually arranged to support the work pieces in a horizontal position during the honing operation. In such machines the honing tool is carried on an elongated power driven spindle or on a driver which constitutes an extension of the spindle, the driver being of sufficient length to extend substantially entirely through the work piece so that the tool may be traversed from one end of the work piece to the other. The use of horizontal honing machines has been restricted heretofore to work pieces of moderate length as, for example, twenty feet or less, because of the difficulty of preventing vibration or "whip" when the driver is rotated at the speed required in the honing operation. The present invention aims to overcome the above difficulty, and its primary object is to provide an improved honing machine adapted to hone work pieces of any length that can be handled in the preliminary stages of production and to dress such long work pieces with a high degree of accuracy for roundness and straightness, and with an extremely smooth, true surface finish.

A more specific object is to provide novel means for supporting the tool driver of a horizontal honing machine at one or more intermediate points so as to effectually eliminate vibration or "whip" when the driver is rotated.

Another object is to provide an improved support for the rotating and reciprocating tool driver of a horizontal honing machine, together with novel means for reciprocating the support in timed relation to the reciprocation of the driver.

Still another object is to provide novel means for coordinating the reciprocatory movements of a plurality of supports for a rotating and reciprocating tool driver to maintain the supports properly spaced apart for adequately supporting the driver without interfering with its reciprocation.

Other objects and advantages of the invention will become apparent from the following detailed description of the preferred embodiment illustrated in the accompanying drawings, in which:

Figure 1 is a side elevation of the bed end of a horizontal honing machine embodying the features of the invention.

Fig. 2 is a plan view of the left end of the machine bed showing the positions of the tool driver supports when the head is fully retracted.

Fig. 3 is a plan view of the right end of the machine bed as it appears when the head is in its advanced position.

Fig. 4 is a plan view showing the positions of the driver supports when the head is in the fully advanced position.

Fig. 5 is a sectional view taken along the line 5—5 of Fig. 4 showing details of the supports.

Fig. 6 is a sectional view taken along the line 6—6 of Fig. 4 showing one of the supports in end elevation.

Fig. 7 is a sectional view taken along the line 7—7 of Fig. 6 showing details of the latch mechanism for temporarily holding a support at the forward end of the machine bed.

Fig. 8 is a sectional view taken along the line 8—8 of Fig. 4 showing details of the mechanism for operatively connecting the spindle head with a support.

Fig. 9 is a sectional view taken along the line 9—9 of Fig. 8 showing the relative arrangement of the connecting means for a plurality of supports.

Fig. 10 is a sectional view similar to Fig. 8 by showing the connecting means engaged.

While the invention is susceptible of various modifications and alternative constructions, I have shown in the drawings and will herein describe in detail the preferred embodiment, but it is to be understood that I do not thereby intend to limit the invention to the specific form disclosed but intend to cover all modifications, adaptations and alternative constructions falling within the spirit and scope of the invention as expressed in the appended claims.

Referring to Figs. 1 to 3 of the drawings, the machine selected to illustrate the invention comprises generally an elongated base consisting of a bed section 15 and a work supporting section 16 bolted or otherwise rigidly secured together in end-to-end relation. Guide bars 17 mounted on the side walls of the bed section in parallel spaced relation form a track or guideway for a reciprocatory spindle head 18 (Figs. 1 and 4). Journaled on the head 18 is a spindle 19 to which is coupled an elongated shaft or driver 20 carrying at its free end a cylindrical abrasive tool or hone 21 of the usual and well known type. Any suitable means such as electric motor 22, herein shown as mounted on the head 18, may be utilized to rotate the spindle 19 and with it the driver 20 and tool 21. Since the driver is coupled with the spindle, the tool 21 may be reciprocated axially of a work piece supported on the base section 16 by reciprocation of the spindle head 18 on the guideway.

In the particular machine illustrated, the head 18 is reciprocated on the guideway to traverse the tool over the work piece by means of flexible cables 23 and 23ᵃ each connected at one end to the head and anchored at the other end to a grooved cable drum 24 rotatably supported in a housing 24ᵃ at one end of the base section 15. The cable 23 leads directly to the cable drum while the cable 23ᵃ is carried over a sheave 25 yieldably supported at the opposite end of the base section. Any suitable means, such as a reversible hydraulic motor, may be utilized for rotating the cable drum 24, first in one direction and then in the other direction to alternately wind up and pay out the cables 23 and 23ᵃ and thus move the head back and forth on the guideway.

In order to attain the same high degree of accuracy in finishing long work pieces as is commonly attained in the finishing of relatively short work pieces, the honing tool must be traversed from one end of the work piece to the other in one continuous stroke. Since the tool operates within the work piece, it therefore is necessary to provide a driver at least as long as the tool stroke so that the tool may be advanced to the end of the work piece farthest from the head.

It has been found that when the length of the driver is increased beyond a predetermined minimum length, the bending or sag between the head and the tool is sufficient to cause the driver to vibrate or "whip" when it is rotated at the speed required in the honing operation. Further, there is danger of the long driver becoming set in the bent condition if allowed to stand idle for a time with the tool withdrawn from the work. In any event, it is essential to maintain the driver substantially straight at all times to avoid vibration which is reflected in the operation of the tool and which is obviously objectionable in honing machines which are required to work to an accuracy measured in ten thousandths of an inch.

The present invention effectually eliminates the causes of the vibration above referred to regardless of the length of the driver. This is accomplished by providing novel means for supporting the driver at one or more intermediate points. To this end, an independent rest or support 31 is provided for each intermediate point at which support is required.

In order to avoid interference with the reciprocatory movements of the head 18, the supports are mounted to reciprocate with the head and through predetermined different portions of its forward and return strokes. Each rest is therefore arranged to be connected independently with the head through the appropriate portion of its stroke and means is provided for effecting such connection in proper timed relation to the reciprocation of the head.

The exemplary machine is shown equipped with three of the traveling supports, above referred to, identified respectively by the reference characters 31, 31ᵃ and 31ᵇ. The number of supports employed may vary in different machines, depending upon the length of the driver and other factors presented by the particular machine involved. The supports are entirely independent of each other and may be of identical construction. The reciprocating means for the supports are likewise similar, although the connecting mechanisms associated therewith are arranged to become operative at different points in the reciprocation of the head for the reasons above explained.

Referring more particularly to Figs. 4, 5 and 6, each of the traveling supports 31, 31ᵃ and 31ᵇ comprises, in its preferred form, a frame 32 consisting of a single casting generally rectangular in horizontal section. Projecting laterally from each corner of the frame 32 is a lug 33 in which is fixed a vertical pin or stud 34 constituting a shaft for a roller 35. The roller 35, as herein shown, is of generally spool-shaped form presenting inclined opposed bearing surfaces for engagement with the guide bars 17. As there are four of these rollers, two at each side of the frame engaging the respective guide bars, the frame is securely held against movement transversely of the guideway and yet is freely reciprocable thereon.

The front and rear walls of the frame 32 are formed with outwardly projecting flanges 36 and 37 defining alined upwardly opening semicylindrical recesses. Disposed in these recesses and bolted or otherwise removably secured to the flanges 36 and 37 are a pair of spiders 38 (Fig. 6) which support between them an elongated tubular bearing member 39 in exact axial alinement with the spindle 19. The bearing member 39 is dimensioned to receive the driver 20 with a sliding and rotating fit and thus constitutes a movable bearing for supporting the driver at an intermediate point.

The bearing member 39 and its supporting spiders 38 may be readily removed from the machine without disconnecting the tool driver by simply withdrawing the connecting bolts and rocking the spiders through a half revolution of the axis of the driver. The bearing member is split longitudinally as indicated at 40, so that one section may be removed to free the parts. The use of the split bearing member also facilitates the removal of the driver from the machine.

In order to enable the supports to carry out their functions of supporting the driver during the reciprocation of the head without at the same time interfering with such reciprocation, it is necessary to move them with the head through predetermined portions of its forward and return strokes. To this end, the invention provides novel means for temporarily connecting each support with the head 18 independently of the other supports.

The connecting means, in its preferred form, comprises a series of endless flexible cables 41, 41ᵃ and 41ᵇ individual to the supports 31, 31ᵃ and 31ᵇ, respectively, and operatively connected thereto. Each cable is looped over freely running sheaves 42 and 43 (Figs. 1, 2 and 3) journaled at opposite ends of the base section 15. The sheaves are so positioned that the upper run of the cable is parallel to the guideway and lies just below the tool head 18. Through the medium of a novel connecting mechanism (Fig. 8), the cable 41 is temporarily connected with the head whereby the support to which it is attached is pulled along with the head in its reciprocation on the guideway.

The invention may be more easily explained and understood by describing the general mode of operation before entering in a detailed description of the specific structure by which the desired results are obtained. In particular, it will be helpful to consider first the sequence in which the connecting mechanisms for the several cables are engaged and disengaged as the head passes a predetermined point in its forward and return strokes. Preferably, the connecting mechanisms are arranged to be engaged when the head is in retracted position or at the right end of the guideway and the supports 31, 31ª and 31ᵇ are spaced along the guideway as shown in Figs. 1 and 2. The fully retracted position of the head is designated by the reference character A in Fig. 3. The head is advanced to position B to insert the tool in the work piece and then reciprocated in its working stroke the rearward limit of which is position B. The three supports advance with the head to position C at which the connecting mechanism for support 31 is disengaged, thereby interrupting the forward movement of that support. Support 31 therefore remains stationary in its advanced position adjacent the left end of the guideway.

Supports 31ª and 31ᵇ continue their forward movement with the head to position D (Fig. 3) at which point the connecting mechanism for the support 31ª is disengaged. Support 31ᵇ now moves forward alone with the head until the associated connecting mechanism is disengaged at position E. The supports all remain stationary while the head completes its forward stroke.

Upon the return of the head, the supports are picked up progressively but in the reverse order and carried along with the head to their respective retracted positions. Thus, as the head passes position E, the connecting mechanism for the support 31ᵇ becomes engaged and this support moves back with the head. Support 31ª is picked up as the head passes position D and support 31 is picked up at position C. Thus the supports travel with the head through predetermined different positions of its forward and return strokes so as to provide adequate support for the tool driver without interfering with the reciprocation of the head.

Having in mind the general mode of operation above explained, the preferred form of mechanism for effecting movement of the supports will now be described. In the particular machine illustrated, the cable 41, which comprises a part of the connecting means, is yieldably connected with the support 31 by means of an elongated pin 44 which also serves to connect the ends of the cable together to form an endless loop. The pin projects through an aperture in a bracket 45 bolted or otherwise secured to the underside of the casting 32 as shown in Fig. 7. A coiled compression spring 47 is interposed between a nut 48 threaded onto one end of the pin 44 and the bracket 45, and a similar spring 49 is interposed between the bracket and a nut 50 threaded onto the opposite end of the pin. The springs thus permit a limited degree of movement between the pin and the bracket, which movement is utilized for operating a latch mechanism arranged to hold the support against premature movement from its advanced position.

The latch mechanism in its preferred form comprises a latch bolt 51 slidably supported on the bracket 45 in a vertical bore 52 which intersects the pin receiving aperture in the bracket. The lower end of the bolt terminates in a latch lug 53 adapted to engage a shoulder 54 formed on a stationary catch 55 rigidly secured to a bed plate 56 extending longitudinally of the machine bed. The rear face 56ª of the catch 55 is inclined and acts on the inclined front face 57 of the latch lug 53 to cam the latch bolt upwardly against the action of a compression spring 58 as the support moves to the forward end of the guideway. The spring 58 then projects the latch bolt into latching position whereby the return movement of the support is blocked.

The withdrawal of the latch bolt 51 is effected automatically, in the present instance, when a predetermined tension is applied to the cable 41 to move the support 31 toward the opposite end of the guideway. For this purpose, the latch bolt 51 is apertured for the reception of the pin 44. The pin is formed with a reduced intermediate portion 59 which permits the latch member to move down into latching position under the action of the spring 58. Withdrawal of the latch bolt is effected by means of an annular cam surface 60 formed on the pin 44 adjacent the reduced intermediate portion 59 which coacts with an inclined cam surface 61 on the latch bolt. The springs 47 and 49 normally hold the pin in a central position in which the latch bolt is operative to engage the catch 55 and thus prevent movement of the support to the right, as viewed in Fig. 7. However, when sufficient tension is exerted on the cable 41, the pin is shifted axially, compressing the spring 47, and the cam surface 60 of the pin 42 acts to cam the latch bolt out of the path of the catch as above described, thereby freeing the support for movement. In this way, accidental movement of the support toward retracted position (to the right as viewed in Fig. 7) through friction of the parts is effectually avoided.

The cables 41ª and 41ᵇ are connected with their respective supports 31ª and 31ᵇ in the same way as the cable 41 and support 31 above described. As the structure provided for this purpose is the same in each instance, no further description is believed to be necessary.

The mechanism for temporarily connecting the cables with the head 18 may be of any suitable type. As herein shown, it comprises separable parts 65 and 66 secured respectively to the head and to the cable. The part 65 includes a slidable latch 67. The part 66, which is of generally cylindrical form, is provided with an annular groove 68 for the reception of the latch and accordingly functions as a keeper, as will appear presently. The cables 41ª and 41ᵇ are equipped with similar keepers 66ª and 66ᵇ cooperating with latch devices 65ª and 65ᵇ, respectively, which are mounted on the head 18 adjacent the latch device 65, as shown in Fig. 9.

Referring more particularly to Fig. 8, the keeper 66 in its preferred form comprises a front member 69 and a rear member 70, each provided with an oppositely facing conical socket 71 for receiving a conical thimble or collet 72 clamped on the cable 41. A cylindrical rod 73 of substantially smaller diameter than the members connects them together as a unit. The adjacent ends of the members 69 and 70 thus cooperate with the rod 73 to define the annular groove 68 for the reception of the latch 67.

The member 69 is preferably of cylindrical cross section and its outer end is tapered to form a generally conical cam surface 74. The rear member 70 consists of a cylindrical inner end portion of the same diameter as the member 69 and an enlarged outer end portion defining a generally vertical shoulder or abutment 75 spaced rearwardly of the latch groove 68.

The latch device 65, which cooperates with the keeper 66, preferably comprises a pair of brackets 76 and 77 bolted or otherwise rigidly secured to the underside of the head in spaced relation. The support-shifting cable 41 is threaded through axially alined apertures 78 formed in the respective brackets as shown in Fig. 8. These apertures are dimensioned to receive the member 69 of the keeper and also the reduced end portion of the member 70 with a sliding fit but to block the passage of the enlarged end portion of the latter member. Thus, when the head is moved to the right as viewed in Fig. 8, the member 69 and the inner end portion of the member 70 will enter the apertures and the bracket 77 will engage the shoulder 75 and carry the cable 41 along with the head. To prevent excessive wear, the aperture in the bracket 77 is encircled by a hardened steel ring 79 (Fig. 10) positioned for engagement with the shoulder 75. The outer end of the ring is beveled as indicated at 80 and serves to guide the members 69 and 70 into the apertures.

Connection of the cable 41 to the head 18, for moving the associated support 31 with the head through a portion of its forward stroke, is effected through the medium of the latch 67 which is slidably supported between the brackets 76 and 77 and guided for vertical movement by a headed bolt 82 carried on the bracket 77 and operating in a vertical slot 83 in one face of the latch. The latch is formed with a suitable aperture 84 dimensioned to receive the member 69 and adapted, when alined with the apertures 78, to allow the member 69 of the keeper to pass through to the position shown in Fig. 10.

A coiled compression spring 85 normally holds the latch 67 in its lowermost position with the apertures 78 and 84 out of alinement. However, when the head moves toward its retracted position or to the right as shown in Fig. 8, an inclined cam surface 86 formed on the latch adjacent the aperture 84 is engaged by the cam surface 74 of the member 69 of the keeper which lifts the latch against the action of the spring 85 to permit the member to slide through to the position shown in Fig. 10. The spring 85 then forces the latch downwardly into the groove 68 until it rests on the pin 73. In this position, the latch presents an abutment 87 in the path of member 69 so that upon movement of the head 18 to the left, the abutment 87 acting on the member 69 serves to carry the cable 41 forwardly with the head.

In order to interrupt the movement of the support 31 as it approaches the end of the guideway, means is provided for releasing the latch 67 as the head 18 passes a predetermined point in its forward stroke. This means, as herein shown, comprises a cam 88 (Fig. 10) adapted to be engaged by a roller 89 carried on the lower end of the latch. The cam is shaped so as to lift the latch sufficiently to withdraw the shoulder 87 from the path of the member 69, thereby interrupting the driving connection between the head and the cable so that the head can move through the remaining portion of its stroke while the cable and the support to which it is secured remain stationary.

The cam 88 is desirably supported in a manner such as to permit its being shifted longitudinally of the machine bed so that the point at which the keeper 66 and latch device 65 are engaged and disengaged can be adjusted to suit the requirements of different kinds of work. To this end, the cam 88 as well as similar cams 88$^a$ and 88$^b$, provided when additional supports are employed, are carried on a supporting bracket 90 having laterally spaced depending arms 91 adapted to straddle an elongated supporting bar 92 rigid with the bed plate 56 and extending longitudinally of the machine bed. Set screws 93 threaded into one of the arms 91 engage the bar 92 to hold the cam securely in set position.

Where a plurality of driver supports are employed, as in the exemplary machine, the cam supporting brackets 90 are constructed so as to position the cams 88, 88$^a$ and 88$^b$ (Fig. 9) in the path of the latch actuating rollers 89, 89$^a$ and 89$^b$ which, as above explained, are mounted side by side on the head. Thus, as shown in Fig. 9, the bracket 90 is provided with a lateral extension 94 for supporting the cam 88. The brackets for supporting the cams 88$^a$ and 88$^b$ are formed without extensions but the cams are mounted at opposite ends of the respective brackets and are thus spaced apart similar to the spacing of the rollers 89$^a$ and 89$^b$.

In order to positively stop the support 31 as it reaches the end of the guideway and after it is disconnected from the head, a stop bracket 95 (Figs. 4 and 5) bolted to the forward end of the bed section 15 is provided with a pair of adjustable stops 96. The stops 96, as herein shown, comprise headed bolts threaded into the bracket so as to project forwardly and engage resilient pads or bumpers 97 (Fig. 5) set in recesses in the end wall of the support. The support 31 in turn is provided with similar stops 96$^a$ for cooperating with the support 31$^a$ while the latter support carries stops 96$^b$ for cooperation with the support 31$^b$. By this means, all of the supports are brought to rest at the end of the guideway with a minimum of shock.

Suitable means is also provided for positively stopping the head 18 at the end of its forward stroke. As shown in Fig. 4, this means comprises brackets 98 adjustably secured to the walls of the bed section 15 on opposite sides of the guideway. Stop bolts 99 threaded into upstanding lugs 100 formed on the respective brackets project forwardly to engage suitable pads carried on brackets 101 bolted or otherwise rigidly secured to the head.

As explained hereinbefore, the supports 31, 31$^a$ and 31$^b$ are adapted to move with the head through predetermined different portions of its return stroke in order to avoid interfering with the reciprocation of the head. This is accomplished in the present instance by spacing the cams 88, 88$^a$ and 88$^b$ progressively along the guideway at positions C, D and E in Fig. 3. With the cams so spaced, the connecting mechanisms for the respective supports will be engaged and disengaged automatically as the head passes the points indicated.

As the head advances from position A, supports 31, 31$^a$ and 31$^b$ move with it (to the left as viewed in Fig. 3) until the cam roller 89 of the latch device 65 engages the cam 88 at position C. The keeper 66 is thus disengaged from the latch device, as above explained, and movement of the support 31 is interrupted by the stops 96. This interruption takes place immediately after the latch lug 53 drops over the catch 55 adjacent the end of the guideway. The keeper 66 thus remains stationary at point C.

Supports 31$^a$ and 31$^b$ continue their forward movement with the head until the first mentioned support abuts against the stops 96$^a$ carried by the support 31 at the end of the guideway and the latch lug 53$^a$ drops over the catch 55$^a$. At the same time, the cam roller 89$^a$ of the latch device 65$^a$ engages the cam 88$^a$ and disengages the keeper 66ª from the associated latch device at position D. Support 31ᵇ continues forward alone with the head until the cam 88ᵇ disengages the latch 66ᵇ at the position E. The supports accordingly remain stationary at the forward end of the guideway, as shown in Fig. 4, until the head completes its forward stroke as defined by the stops 99. The keepers 66, 66ª and 66ᵇ are accordingly spaced along the guideway above the cams 88, 88ª and 88ᵇ at positions C, D and E, as shown in Fig. 3.

Upon the return movement of the head 18, the supports are picked up progressively and carried along with the head until they reach their normal positions. The supports are retained in advanced position, however, by the associated latches 53, 53ª and 53ᵇ until the pickup is effected by engagement of the latch devices with the keepers. Thus, as the head passes position E, keeper 66ᵇ is engaged by the latch device 65ᵇ so that tension is applied to the cable 41ᵇ to release the latch 53ᵇ. The support 31ᵇ therefore moves rearwardly with the head through the remainder of its stroke. At position D, keeper 66ª is engaged by the latch device 65ª, and in position C, keeper 66 is engaged by latch device 65.

In the normal operation of the machine, the rearward end of the working stroke of the head is at position B. As keeper 66 is engaged and disengaged at point C, the support 31 with which it is associated thus moves with the head through the portion of its stroke represented by the line B—C. Supports 31ª and 31ᵇ in turn move with the head through the portions of its stroke represented by the lines B—D and B—E, respectively.

When the head is fully retracted to withdraw the tool from the work, all of the supports move together with the head through the additional range of travel represented by the line A—B. Thus, the supports travel with the head through predetermined different portions of its forward and return strokes so as to provide adequate support for the tool driver without interfering with the reciprocation of the head.

It will be apparent from the foregoing that the invention provides a honing machine of novel and improved construction capable of honing work pieces of relatively great length. The machine embodies novel means for supporting the long tool driver intermediate its ends so as to effectually eliminate vibration or "whip" when the driver is rotated, thereby enabling the machine to dress such long work pieces with a high degree of accuracy for roundness and straightness and with an extremely true, smooth surface finish. The supports for the driver are supported on the same guideway as the head, and through the medium of novel connecting means are adapted to be reciprocated with the head through predetermined different portions of its forward and return strokes so as to adequately support the tool driver without interfering with the reciprocation of the head.

I claim as my invention:

1. In a honing machine, in combination, an elongated base, a horizontally disposed guideway on said base, a head reciprocable on said guideway, an elongated rotatable tool driver projecting forwardly from the head and reciprocable therewith, means for supporting said driver intermediate its ends including a plurality of independently movable supports mounted for reciprocation on said guideway, a tubular bearing member on each support for receiving the driver with a sliding and rotating fit, and means for reciprocating said supports through strokes of predetermined different lengths comprising endless flexible cables individual to the supports, each cable being anchored to its support and looped over sheaves disposed at opposite ends of the machine base, cooperating means on the head and each of said cables for detachably connecting the cables to the head whereby movement of the head is imparted to the associated supports, and means on the machine base for engaging and disengaging said connecting means as said head moves through predetermined positions.

2. In a honing machine, in combination, an elongated base, a horizontally disposed guideway on said base, a head reciprocable on said guideway, an elongated rotatable tool driver projecting forwardly from the head and reciprocable therewith, means for supporting said driver intermediate its end including a plurality of independently movable supports mounted for reciprocation on said guideway, and means for independently connecting each support with said head for movement with the head through a predetermined portion of its forward and return strokes, the extent of movement being different for each support, said connecting means including flexible cables anchored to the respective supports and looped over sheaves supported below and at opposite ends of the guideway, and means for detachably connecting said cables with the head.

3. In a honing machine, in combination, an elongated base, a horizontally disposed guideway on said base, a head reciprocable on said guideway, means for reciprocating said head through a plurality of forward and return strokes, an elongated rotatable tool driver projecting forwardly from the head and reciprocable therewith, means for supporting said driver intermediate its ends including a plurality of independently movable supports mounted for reciprocation on said guideway, a flexible cable anchored to each support and looped over sheaves supported below and at opposite ends of the guideway, and means for operatively connecting said cables to said head through different positions of its forward and return strokes to impart different degrees of movement to the respective supports.

4. In a honing machine, in combination, an elongated base, a horizontally disposed guideway on said base, a head reciprocable on said guideway, means for reciprocating the head through a plurality of forward and return strokes, an elongated rotatable tool driver projecting forwardly from the head and reciprocable therewith, means for supporting said driver intermediate its ends including a plurality of independently movable supports mounted for reciprocation on said guideway, and means for progressively connecting and disconnecting said supports and said head to move the supports with the head through different positions of its forward and return strokes.

5. In a honing machine, in combination, a reciprocatory head, a horizontally disposed guideway for said head, a rotatable tool driver projecting from said head generally parallel to said guideway and reciprocable with the head, means for supporting said driver intermediate its ends comprising a support mounted for reciprocation on said guideway, a flexible cable anchored to said support and looped over sheaves below and at opposite ends of the guideway, and means for operatively connecting said cable to the head to move the support with the head through a portion of its reciprocatory stroke.

6. In a honing machine, in combination, a reciprocatory head, a horizontally disposed guideway for said head, a rotatable tool driver projecting from said head parallel to said guideway and reciprocable with the head, means for supporting said driver intermediate its ends comprising a plurality of supports mounted for independent reciprocation on said guideway, and means for reciprocating said supports each through a stroke of different length and in timed relation to the reciprocation of said head.

7. In a honing machine, in combination, a reciprocatory head, a horizontally disposed guideway for said head, a rotatable tool driver projecting from said head parallel to said guideway and reciprocable with the head, means for supporting said driver intermediate its ends comprising a plurality of independent supports mounted for reciprocation on said guideway, and means individual to each support for effecting a positive driving connection between the support and the head while the head is moving through a predetermined portion of its stroke.

8. In a honing machine, in combination, a reciprocatory head, a horizontally disposed guideway for said head, a rotatable tool driver projecting from said head parallel to said guideway and reciprocable with the head, means for supporting said driver intermediate its ends comprising a plurality of independent supports mounted for reciprocation on said guideway, and means for reciprocating said supports through strokes of progressively varying length in timed relation to the reciprocation of said head.

9. In a honing machine, in combination, a reciprocatory head, a horizontally disposed guideway for said head, a rotatable tool driver projecting from said head parallel to said guideway and reciprocable with the head, means for supporting said driver intermediate its ends comprising a plurality of independent supports mounted for reciprocation on said guideway and movable into abutting relationship at one end of the guideway when the head is advanced to its forward position, and means for connecting said supports to said head progressively in the return movement of the head whereby to shift the supports to predetermined spaced positions on said guideway.

10. In a honing machine, in combination, a reciprocatory head, a horizontally disposed guideway for said head, a rotatable tool driver projecting from said head generally parallel to said guideway and reciprocable with the head, means for supporting said driver intermediate its ends comprising a support mounted for reciprocation on said guideway, means for operatively connecting said support with the head so as to move the support to the forward end of the guideway incident to the forward movement of the head, latch means operative to hold the support at the forward end of the guideway while the head executes a portion of its return stroke, and means for disengaging said latch means and for operatively connecting the support with the head to move the support therewith through the remainder of its return stroke.

11. In a honing machine, in combination, a reciprocable support, a flexible cable for reciprocating said support, an elongated pin connecting the ends of said cable, means connecting said pin to said support for limited endwise movement relative to the support, a latch bolt for holding the support against movement, and means on said pin coacting with means on said latch bolt to withdraw the latch bolt from latching position upon movement of the pin relative to the support when tension is applied to the cable to move the support.

12. In a honing machine, in combination, a reciprocable support, a flexible cable for reciprocating said support, an elongated pin connecting the ends of said cable, means connecting said pin to said support for limited endwise movement relative to the support, a latch bolt for holding the support against movement, a cam surface formed on said pin, a cooperating cam surface on said bolt, said pin acting through said cam surfaces to withdraw the bolt from latching position upon movement relative to the support, and means for applying tension to said cable to first move said pin and unlatch the support and then move the support.

13. A latch mechanism comprising, in combination, a bracket, a latch bolt slidably supported in a bore formed in the bracket, a spring acting on one end of the bolt tending to hold the bolt in latching position, a pin extending through the bracket and said latch bolt, a cam surface on said pin, a cooperating cam surface on said bolt, and means for shifting said pin axially to engage said cam surfaces and thereby move the bolt out of latching position.

14. In a honing machine having a pair of reciprocatory members, in combination, power actuated means for reciprocating one of said members through a plurality of forward and return strokes, means for operatively connecting said one member to the other member to reciprocate the same comprising, an endless flexible cable connected to the other member and having one run extending parallel to the path of said one member, a keeper secured to said cable, a latch device carried by said one member operative to engage said keeper, and means for operating said latch device at predetermined positions in the forward and return strokes of said one member.

15. In a honing machine having a pair of reciprocatory members, in combination, power actuated means for reciprocating one of said members through a plurality of forward and return strokes, means for operatively connecting said one member to the other member to reciprocate the same comprising, an endless flexible cable connected to the other member and having one run extending parallel to the path of said one member, a keeper secured to said cable, a latch device carried by said one member operative to engage said keeper at a predetermined point in its forward stroke and thereby move the other support through the remainder of the stroke, and means for disengaging the latch device as said one member passes said predetermined point on its return stroke to interrupt the movement of the other support.

16. The combination with a reciprocatory member and a flexible cable extending parallel to the reciprocatory path of the member, of connecting mechanism for temporarily connecting the cable to the member comprising, a keeper secured to said cable, a latch device carried by said member including a pair of brackets apertured to receive said cable and said keeper, a latch slidably supported between said brackets, said latch being apertured to receive the cable and the keeper, and means for shifting said latch to engage the keeper and hold it against movement relative to the bracket.

17. The combination with a reciprocatory member and a flexible cable extending parallel to the reciprocatory path of the member, of connecting mechanism for temporarily connecting the cable to the member comprising, a keeper secured to said cable, a latch device carried by said member including a pair of brackets apertured to receive said cable and said keeper, a latch slidably supported between said brackets, an aperture in said latch adapted to aline with the apertures in said brackets when the latch is shifted to one position to permit said keeper to enter the apertures in the brackets, and means for shifting said latch from said one position to prevent withdrawal of the keeper.

18. In a honing machine, in combination, a reciprocatory head, a horizontally disposed guideway for said head, a rotatable tool driver projecting from said head generally parallel to the guideway and reciprocable with the head, means for supporting said driver intermediate its ends comprising a support mounted for reciprocation on the guideway, a cable anchored to said support, and means acting through said cable to move the support through a stroke having a predetermined relation to the reciprocatory stroke of the head and in timed relation thereto.

19. In a honing machine, in combination, a reciprocatory head, a guideway for said head, a rotatable tool driver projecting from the head generally parallel to said guideway and reciprocable with the head, means for supporting said driver intermediate its ends comprising a plurality of supports mounted for independent reciprocation on said guideway and movable into abutting relationship at one end of the guideway when the head is advanced to its forward position, and means operating in the return movement of the head for moving the supports back progressively to predetermined spaced positions along the guideway.

20. The combination with a reciprocatory member and a flexible cable extending generally parallel to the reciprocatory path of the member, of connecting mechanism for temporarily connecting the cable to the member comprising, a keeper secured to said cable, a latch carried by said member for cooperation with said keeper, means tending to move said latch into a position to engage the keeper and hold it for movement with the member, and means operable as an incident to the movement of the member for withdrawing said latch to release the keeper.

HARRY J. CALDWELL.